(12) United States Patent
Dalsgaard (10) Patent No.: US 9,247,472 B2
(45) Date of Patent: Jan. 26, 2016

(54) METHOD AND APPARATUS FOR ACCOMMODATING DISCONTINUOUS RECEPTION IN A HANDOVER DETERMINATION

(75) Inventor: Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 126 days.

(21) Appl. No.: 14/110,187

(22) PCT Filed: Apr. 3, 2012

(86) PCT No.: PCT/FI2012/050333
§ 371 (c)(1),
(2), (4) Date: Oct. 7, 2013

(87) PCT Pub. No.: WO2012/136889
PCT Pub. Date: Oct. 11, 2012

(65) Prior Publication Data
US 2014/0031027 A1    Jan. 30, 2014

Related U.S. Application Data

(60) Provisional application No. 61/472,727, filed on Apr. 7, 2011.

(51) Int. Cl.
*H04M 3/00* (2006.01)
*H04W 36/30* (2009.01)
(Continued)

(52) U.S. Cl.
CPC .......... *H04W 36/30* (2013.01); *H04W 36/0088* (2013.01); *H04W 24/10* (2013.01); *Y02B 60/50* (2013.01)

(58) Field of Classification Search
CPC .............................. H04W 24/10; H04W 36/30
USPC ........ 455/574, 436, 404.1, 435.1, 507, 552.1, 455/450, 418, 456.1; 370/331, 252, 311, 370/242, 328, 329
See application file for complete search history.

(56) References Cited

U.S. PATENT DOCUMENTS 7,957,360 B2    6/2011  Suzuki et al.
2008/0318643 A1*  12/2008  Manna et al. ................. 455/574
(Continued)

FOREIGN PATENT DOCUMENTS

EP         2200364 A2     6/2010
JP       2010141666 A     6/2010
(Continued)

OTHER PUBLICATIONS

International Search Report and Written Opinion received in corresponding Patent Cooperation Treaty Application No. PCT/FI2012/050333. Dated Jul. 13, 2012. 11 pages.
(Continued)

*Primary Examiner* — Kiet Doan
(74) *Attorney, Agent, or Firm* — Alston & Bird LLP (57) ABSTRACT

A method, apparatus and computer program product are provided that continue to obtain the power saving advantages provided by discontinuous reception, while obtaining the measurement samples that are desired during a sampling time period, such as during a time to trigger period, to determine of handover is appropriate. In the context of a method, a measurement sample is caused to be obtained during a discontinuous reception monitoring period. The method may determine that a sampling time period has been commenced based upon a measurement sample. During the sampling time period, one or more additional measurement samples are to be obtained. The method may also determine that the additional measurement samples will not be obtained prior to commencement of the sleep period between monitoring periods and, as a result, cause one or more additional measurement samples to be obtained at respective times that would otherwise have been in the sleep period.

14 Claims, 6 Drawing Sheets

(51) Int. Cl.
*H04W 36/00* (2009.01)
*H04W 24/10* (2009.01)

(56) References Cited

U.S. PATENT DOCUMENTS

| | | |
|---|---|---|
| 2009/0238098 A1 | 9/2009 | Cai et al. |
| 2010/0111039 A1 | 5/2010 | Kim et al. |
| 2010/0216455 A1 | 8/2010 | Kazmi |
| 2010/0273487 A1 | 10/2010 | Alonso-Rubio et al. |
| 2010/0296410 A1* | 11/2010 | Kazmi et al. ............ 370/252 |
| 2011/0124340 A1 | 5/2011 | Puttonen et al. |
| 2011/0269462 A1* | 11/2011 | Sagfors et al. ........... 455/436 |

FOREIGN PATENT DOCUMENTS

| | | |
|---|---|---|
| WO | 2008023242 A2 | 2/2008 |
| WO | 2008126380 A1 | 10/2008 |
| WO | 2009157311 A1 | 12/2009 |
| WO | 2010048851 A1 | 5/2010 |

OTHER PUBLICATIONS

"3rd Generation Partnership Project; Technical Specification Group Radio Access Network; Evolved Universal Terrestrial Radio Access (E-UTRA); Requirements for support of radio resource management (Release 10)", 3GPP TS 36.133, V10.1.0, Dec. 2010, 402 pages.

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321, V10.0.0, Dec. 2010, 53 pages.

"3rd Generation Partnership Project;Technical Specification Group Radio Access Network;Evolved Universal Terrestrial Radio Access (E-UTRA);Radio Resource Control (RRC);Protocol specification(Release 10)", 3GPP TS 36.331, V10.0.0, Dec. 2010, pp. 1-276.

"3rd Generation Partnership Project; Technical Specification Group Radio Access Network; Improved Network Controlled Mobility between E-UTRAN and 3GPP2/Mobile WiMAX Radio Technologies (Release 9)", 3GPP TR 36.938, V9.0.0, Dec. 2009, pp. 1-34.

Extended European Search Report received for corresponding European Patent Application No. 12767890.2, dated Mar. 25, 2015, 9 pages.

"Discussions on Measurement Reporting in DRX", 3GPP TSG RAN WG4 Meeting #48, R4-081844, Agenda item: 6.1.7.6, Aug. 18-22, 2008, 2 pages.

Alsono-Rubio, J. et al., *Self-Optimization for Handover Oscillation Control in LTE*, IEEE/IFIP Network Operations and Management Symposium, (2010) 950-953.

* cited by examiner

METHOD AND APPARATUS FOR ACCOMMODATING DISCONTINUOUS RECEPTION IN A HANDOVER DETERMINATION

RELATED APPLICATIONS

This application was originally filed as PCT Application No. PCT/FI2012/050333 filed Apr. 3, 2012.

TECHNOLOGICAL FIELD

Embodiments of the present invention relate generally to communications technology and, more particularly, to providing for a handover in a manner that accommodates discontinuous reception.

BACKGROUND

In order to determine if a mobile terminal should be handed over from a serving cell to a target cell, the mobile terminal may obtain a number of measurement samples of the signal power and/or the signal quality for signals exchanged with the serving cell and one or more candidate cells including the target cell. In general, when a target cell is perceived to provide signals of a higher power and/or quality than the serving cell, the mobile terminal may transmit a measurement report based upon the measurement samples from the serving cell and the candidate cells to the network to facilitate a determination as to whether the mobile terminal should be handed over to the target cell.

Because of the varying nature of radio signals and the movement of a mobile terminal, the received signal strength or quality may fluctuate. To avoid handover failure, e.g., radio link failure, or handover oscillation in which a mobile terminal is repeatedly handed back and forth between a pair of cells, the determination as to whether a handover is merited may be based, not on a temporary fluctuation in radio signal power or quality, but on a longer term average or trend of the radio signal power or quality. As such, a mobile terminal may obtain a series of measurements of the received signal strength or quality from various cells over the course of time. In order to reduce the possibility of handover failure or handover oscillation, several handover parameters may be defined to govern the repeated measurement of the received signal strength or quality. These handover parameters include time to trigger (TTT) and handover margin. The TTT is defined as the minimum time that the condition that is required to trigger the handover, such as the received signal power or quality of a target cell exceeding that of the serving cell, must be maintained for a measurement report to be generated. By requiring the conditions be maintained for the TTT, the mobile terminal may cause initiation of a handover in an instance in which the triggering condition is sustained, but not in an instance in which the triggering condition is only temporarily or transiently set aside. In order to continue to monitor the received signal strength or quality throughout the TTT period, the mobile terminal must generally obtain a number of measurement samples throughout the TTT period.

In order to conserve power, discontinuous reception (DRX) techniques have been developed. A mobile terminal generally implements a discontinuous reception technique by having periods in which the mobile terminal monitors network communications, such as by monitoring the physical downlink control channel (PDCCH). During these periods, the mobile terminal may obtain measurement samples, such as of the received signal strength or quality of signals from the serving cell and various candidate cells. The periods in which the mobile terminal monitors the network communications are separated by a sleep period during which the mobile terminal does not monitor the network communications and, instead, conserves power.

Figure 1:
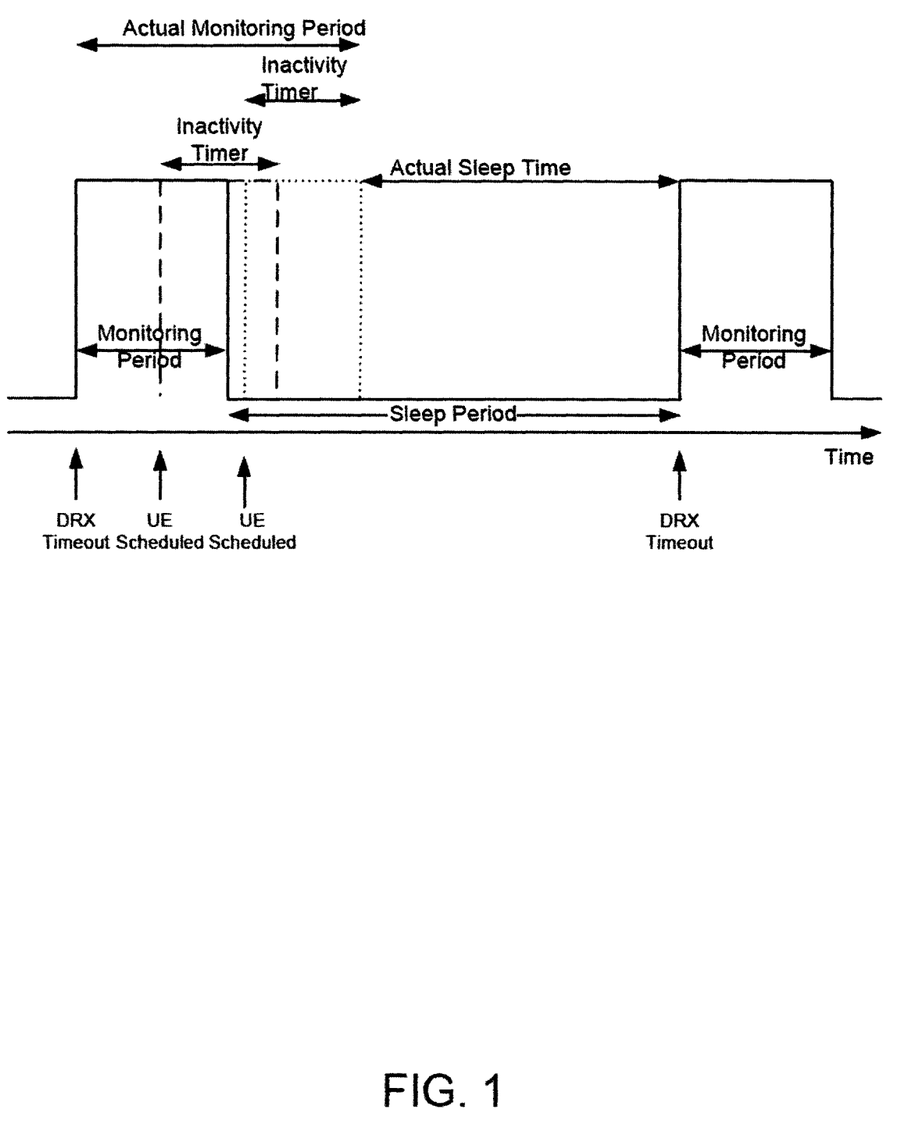
FIG. 1 is a timing diagram illustrating operations of a mobile terminal in accordance with discontinuous reception functionality.

As shown, for example, in FIG. 1, the sleep period may be defined by a DRX timer. Upon expiration of the DRX timer, e.g., DRX timeout, the mobile terminal may be configured to monitor network communications, such as by monitoring the PDCCH. The mobile terminal may be configured to monitor network communications for a predetermined period of time identified in FIG. 1 as the monitoring period. During the monitoring period, the mobile terminal may be scheduled with new data, such as the transmission or reception of data via the uplink or the downlink, respectively. In this instance, the monitoring period during which the mobile terminal will monitor network communications shall be extended by a predetermined time period as measured by an inactivity time. The monitoring period may be extended several times in an instance in which the mobile terminal is repeatedly scheduled with new data. As shown in FIG. 1, for example, the monitoring period is extended twice as a result of the mobile terminal twice being scheduled with new data. The first extension of the monitoring period is shown with dashed lines, while the second extension of the monitoring period is shown with dotted lines. Once either the initial monitoring period or an extension of the monitoring period ends without the mobile terminal being scheduled with new data, the mobile terminal may enter a sleep mode for a period of time governed by the DRX timer. As shown in FIG. 1, the sleep period is measured from the end of the initial monitoring period such that any extension of the monitoring period effectively reduces the sleep period. By alternately monitoring the network communications and sleeping, the power consumption of the mobile terminal may be reduced.

In an instance in which a measurement sample is obtained during the period in which the mobile terminal is monitoring network communications and the measurement sample is such that that the TTT period is commenced, such as a measurement sample in which the received signal power or quality of a signal from a candidate cell is greater than that of a signal from the serving cell, the mobile terminal may obtain additional measurement samples to determine if a handover is advisable. The monitoring period may be sufficiently long to obtain the additional measurement samples that are desired during the TTT period to facilitate the determination regarding handover. However, in some instances, the monitoring period may conclude without the mobile terminal having collected any additional measurement samples or without collecting a sufficient number of additional measurement samples so as to determine if a handover is advisable.

In this instance, the mobile terminal may enter into a sleep period and a determination regarding handover either must be made based upon a fewer number of measurement samples than is desired which, in turn, may lead to handover in instances in which a handover is not desirable, such as in instances in which the initial measurement sample turns out to be aberrational or otherwise not representative of the received signal power or quality of the serving and target cells. As a result of the entry into the sleep period, however, the mobile terminal may be unable to obtain additional measurement samples in order to more appropriately determine if a handover is appropriate. Alternatively, the mobile terminal may wait until the next monitoring period to obtain additional measurement samples which may disadvantageously delay any handover.

BRIEF SUMMARY

A method, apparatus and computer program product are therefore provided according to an example embodiment of the present invention that continue to obtain the power saving advantages provided by discontinuous reception, while obtaining the measurement samples that are desired during a sampling time period, such as during the TTT period, in order to determine of handover is appropriate. As such, the method, apparatus and computer program product of an example embodiment provides for handover to be performed in a reliable manner that reduces the instances of a failed handover or handover oscillation as a result of obtaining multiple measurement samples during the sampling time period. However, the method, apparatus and computer program product of an example embodiment continue to utilize discontinuous reception so as to reduce the power consumption by the mobile terminal, albeit in a modified manner so as to accommodate the measurement sampling desired for handover determinations.

In one embodiment, a method is provided that causes a measurement sample to be obtained during a discontinuous reception monitoring period. The method of this embodiment determines that a sampling time period has been commenced based upon a measurement sample. During the sampling time period, one or more additional measurement samples are to be obtained. The method of this embodiment also determines that the additional measurement samples will not be obtained prior to commencement of the sleep period between monitoring periods and, as a result, causes one or more additional measurement samples to be obtained at respective times that would otherwise have been in the sleep period.

In one embodiment, the method may defer the sleep period and cause the monitoring period to be extended in order to obtain the additional measurement samples prior to commencement of the sleep period. In an instance in which the sampling time period is terminated prior to expiration, the method of this embodiment may also terminate deferral of the sleep period and extension of the monitoring period and may enter the sleep period. The method may also determine an elapsed time since the most recent data transmission. In this embodiment, causing the one or more additional measurement samples to be obtained at respective times that otherwise would have been in the sleep period may be dependent upon the elapsed time being less than the predefined time limit. The method of one embodiment may also cause a measurement report to be provided upon expiration of the sampling time period.

In another embodiment, an apparatus is provided that includes at least one processor and at least one memory including computer program code. The at least one memory and the computer program code are configured to, with the at least one processor, cause the apparatus at least to cause a measurement sample to be obtained during a discontinuous reception monitoring period and to determine that a sampling time period has been commenced based upon the measurement sample during which one or more additional measurement samples are to be obtained. The at least one memory on the computer program code of this embodiment are also configured to, with the at least one processor, cause the apparatus at least to determine that the additional measurement samples will not be obtained prior to commencement of a sleep period between monitoring periods and to cause one or more additional measurement samples to be obtained at respective times that would otherwise have been in the sleep period.

The at least one memory and the computer program code of one embodiment may be configured to, with the at least one processor, defer the sleep period and cause the monitoring period to be extended in order to obtain the additional measurement samples prior to commencement of the sleep period. In an instance in which the sampling time period is terminated prior to expiration, the at least one memory and the computer program code of one embodiment may be configured to, with the at least one processor, terminate deferral of the sleep period and extension of the monitoring period and enter the sleep period. The at least one memory and the computer program code of one embodiment may also be configured to, with the at least one processor, cause the apparatus to determine an elapsed time since the most recent data transmission. In this embodiment, the at least one memory and the computer program code may be configured to, with the at least one processor, cause the apparatus to cause one or more additional measurement samples to be obtained at respective times that would otherwise have been in the sleep period dependent upon the elapsed time being less than the predefined time limit. The at least one memory and the computer program code of one embodiment may also be configured to, with the at least one processor, cause the apparatus to cause a measurement report to be provided upon expiration of the sampling time period.

In a further embodiment, a computer program product may be provided that includes at least one computer-readable storage medium bearing computer program code embodied therein for use with a computer with the computer program code including code for causing a measurement sample to be obtained during a discontinuous reception monitoring period and to determine that a sampling time period has been commenced based upon the measurement sample during which one or more additional measurement samples are to be obtained. The computer program code of this embodiment may also determine that the additional measurement samples will not be obtained prior to commencement of a sleep period between monitoring periods and code for causing one or more additional measurement samples to be obtained at respective times that would otherwise have been in the sleep period.

In one embodiment, the computer program code may include code for deferring the sleep period and causing the monitoring period to be extended in order to obtain the additional measurement samples prior to commencement of the sleep period. In an instance in which the sampling time period is terminated prior to expiration, the computer program code may also include code for terminating deferral of the sleep period and extension of the monitoring period and for entering the sleep period. The computer program code of one embodiment may also include code for determining an elapsed time since the most recent data transmission. In this embodiment, the code for causing one or more additional measurement samples to be obtained at respective times that would otherwise have been in the sleep period may be dependent upon the elapsed time being less than the predefined time limit. The computer program code of one embodiment may also include code for causing a measurement report to be provided upon expiration of the sampling time period.

In one embodiment, an apparatus is provided that includes means for causing a measurement sample to be obtained during a discontinuous reception monitoring period. The apparatus of this embodiment also includes means for determining that a sampling time period has been commenced based upon a measurement sample. During the sampling time period, one or more additional measurement samples are to be obtained. The apparatus of this embodiment also includes means for determining that the additional measurement samples will not be obtained prior to commencement of the sleep period between monitoring periods and means for causing one or more additional measurement samples to be obtained at respective times that would otherwise have been in the sleep period.

In one embodiment, the apparatus may include means for deferring the sleep period and causing the monitoring period to be extended in order to obtain the additional measurement samples prior to commencement of the sleep period. In an instance in which the sampling time period is terminated prior to expiration, the apparatus of this embodiment may also include means for terminating deferral of the sleep period and extension of the monitoring period and means for entering the sleep period. The apparatus may also include means for determining an elapsed time since the most recent data transmission. In this embodiment, the means for causing the one or more additional measurement samples to be obtained at respective times that otherwise would have been in the sleep period may be dependent upon the elapsed time being less than the predefined time limit. The apparatus of one embodiment may also include means for causing a measurement report to be provided upon expiration of the sampling time period.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

The terms "data," "content," "information," and similar terms may be used interchangeably, according to some example embodiments of the present invention, to refer to data capable of being transmitted, received, operated on, and/ or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/ or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Further, as described herein, various messages or other communication may be transmitted or otherwise sent from one component or apparatus to another component or apparatus. It should be understood that transmitting a message or other communication may include not only transmission of the message or other communication, but may also include preparation of the message or other communication by a transmitting apparatus or various means of the transmitting apparatus.

As defined herein, a "computer-readable storage medium", which refers to a non-transitory, physical storage medium (e.g., a volatile or non-volatile memory device), can be differentiated from a "computer-readable transmission medium", which may refer to an electromagnetic signal.

Figure 2:
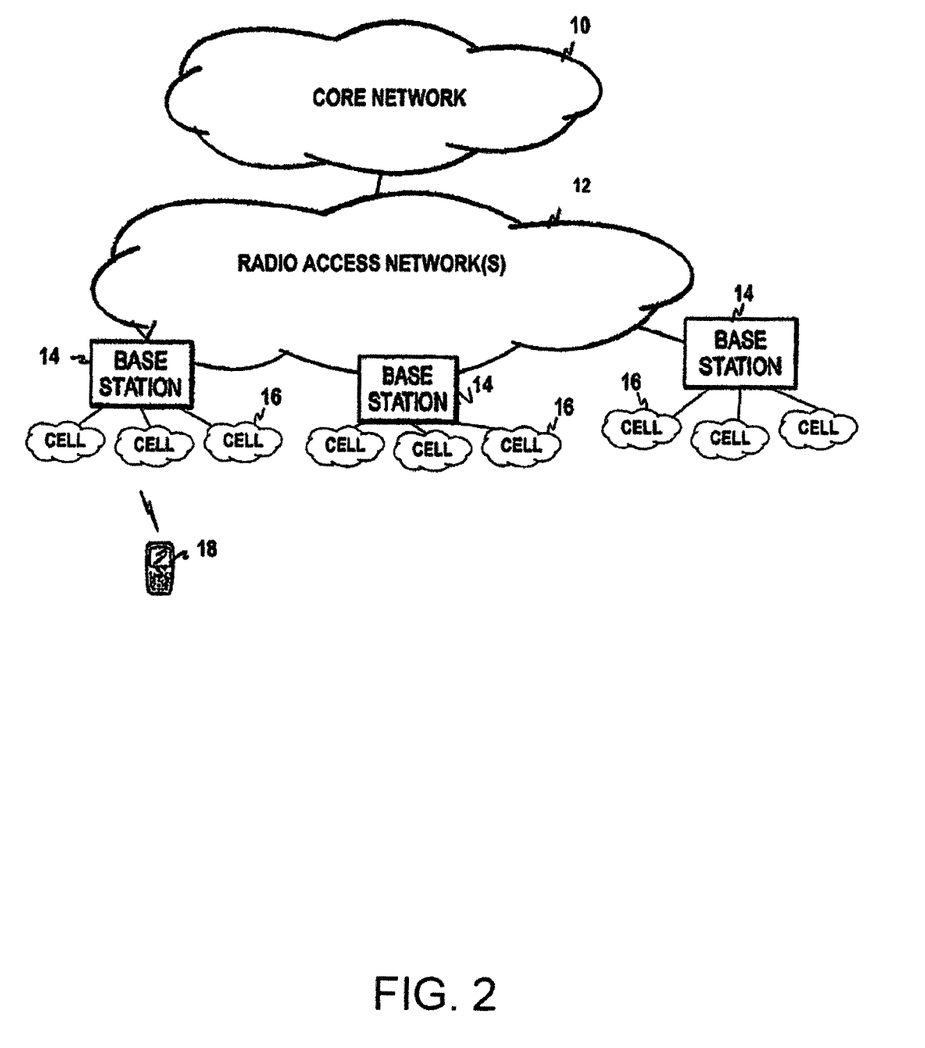
FIG. 2 is a block diagram of a system for supporting handover of a mobile terminal in accordance with one embodiment of the present invention.

A method, apparatus and computer program product are provided in accordance with an embodiment of the present invention for employing a discontinuous reception technique in a manner that accommodates additional measurement samples being obtained in certain circumstances to increase the reliability with which a handover may be made. Although described herein in the context of a handover, the method, apparatus and computer program product of embodiments of the present invention may similarly be employed in conjunction with a cell reselection. Thus, handover is used herein to generically encompass both handover and cell reselection, be it intra-frequency, inter-frequency or inter-radio access technology (RAT). The method, apparatus and computer program product may be employed in a variety of networks that accommodate both discontinuous reception functionality and handover from a serving cell to a target cell. For example, FIG. 2 depicts a heterogeneous communications system according to an example embodiment of the present invention. Generally, the system includes one or more public land mobile networks (PLMNs) coupled to one or more other data or communication networks—notably a wide area network (WAN) such as the Internet. As shown, each of the PLMNs includes a core network 10 backbone such as the Evolved Packet Core (EPC); and each of the core networks and the Internet are coupled to one or more radio access networks 12, air interfaces or the like that implement one or more radio access technologies. As shown, the radio access networks each include one or more base stations 14 (or node B or evolved node B elements), access points or the like, each of which may serve a coverage area divided into one or more cells 16.

In addition, the system includes one or more mobile terminals 18. A mobile terminal may be embodied in various manners including, for example as a mobile computer, mobile telephone, a personal digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. In operation, the mobile terminal may be configured to connect to one or more of the radio access networks 12 according to their particular radio access technologies to thereby access a particular core network of a PLMN, or to access one or more of the other data or communication networks (e.g., the Internet). In various instances, a mobile terminal, such as a dual-mode or multimode mobile terminal, may support multiple (two or more) radio access networks—thereby being configured to connect to multiple radio access networks. For example, a particular mobile terminal may support both Global System for Mobile communications (GSM) and Universal Mobile Telecommunications System (UMTS) radio access technologies.

Examples of radio access technologies include $3^{rd}$ Generation Partnership Project (3GPP) radio access, Universal Mobile Telephone System (UMTS) radio access UTRAN (Universal Terrestrial Radio Access Network), GSM radio access, Code Division Multiple Access (CDMA) 2000 radio access, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, ultra wideband (UWB), Wibree, Zigbee or the like. 3GPP radio access technologies may include, for example, $3^{rd}$ generation (3G) or 3.9G (also referred to as UTRAN Long Term Evolution (LTE) or Super 3G) or E-UTRAN (Evolved UTRAN). Generally, a radio access technology may refer to any $2^{nd}$ generation (2G), 3G, $4^{th}$ generation (4G) or higher generation mobile communication technology and their different versions, as well as to any other wireless radio access technology that may be arranged to interwork with such a mobile communication technology.

Figure 3:
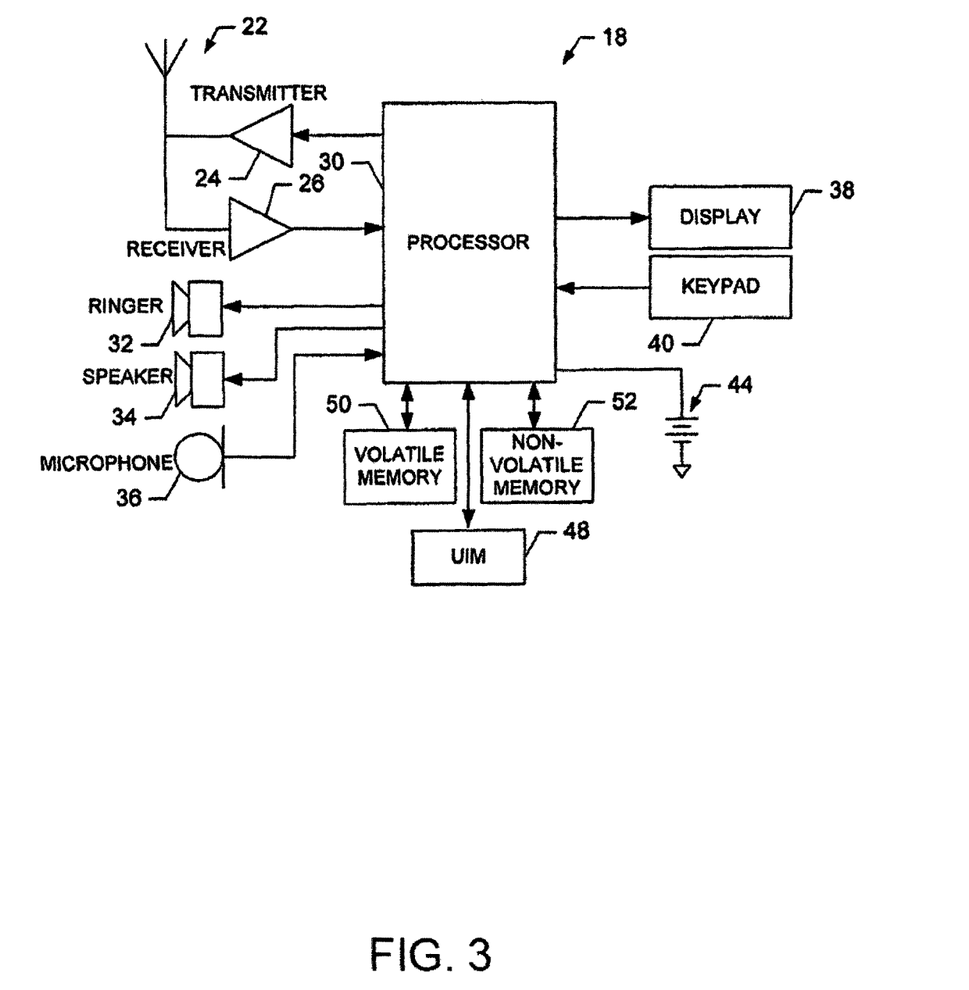
FIG. 3 is a block diagram of a mobile terminal in accordance with one embodiment of the present invention.

Referring now to FIG. 3, a mobile terminal 18 in accordance with one embodiment of the present invention is shown in more detail and is described hereinafter. It should be understood, however, that the mobile terminal as illustrated and hereinafter described is merely illustrative of one type of device that may benefit from embodiments of the present invention and, therefore, should not be taken to limit the scope of embodiments of the present invention. As such, numerous types of mobile terminals, such as portable digital assistants (PDAs), mobile telephones, pagers, mobile televisions, gaming devices, laptop computers, cameras, video recorders, audio/video player, radio, positioning devices (e.g., global positioning system (GPS) devices, or any combination of the aforementioned, and other types of voice and text communications systems, may readily employ embodiments of the present invention.

The mobile terminal 18 may include an antenna 22 (or multiple antennas) in operable communication with a transmitter 24 and a receiver 26. The mobile terminal may further include an apparatus, such as a processor 30, which provides signals to and receives signals from the transmitter and receiver, respectively. The signals include signaling information in accordance with the air interface standard of the applicable cellular system, and also user speech, received data and/or user generated data. In this regard, the mobile terminal is capable of operating with one or more air interface standards, communication protocols, modulation types, and access types. By way of illustration, the mobile terminal is capable of operating in accordance with any of a number of first, second, third and/or fourth-generation communication protocols or the like. For example, the mobile terminal may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN, with fourth-generation (4G) wireless communication protocols or the like. As an alternative (or additionally), the mobile terminal may be capable of operating in accordance with non-cellular communication mechanisms. For example, the mobile terminal 10 may be capable of communication in a wireless local area network (WLAN) or other communication networks.

In some embodiments, the processor 30 may include circuitry desirable for implementing audio and logic functions of the mobile terminal 18. Control and signal processing functions of the mobile terminal are allocated between these devices according to their respective capabilities. The processor thus may also include the functionality to convolutionally encode and interleave message and data prior to modulation and transmission. The processor may additionally include an internal voice coder, and may include an internal data modem. Further, the processor may include functionality to operate one or more software programs, which may be stored in memory. For example, the processor may be capable of operating a connectivity program, such as a conventional Web browser. The connectivity program may then allow the mobile terminal to transmit and receive Web content, such as location-based content and/or other web page content, according to a Wireless Application Protocol (WAP), Hypertext Transfer Protocol (HTTP) and/or the like, for example.

The processor 30 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 30 may be configured to execute instructions stored in a memory device or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or network device) adapted for employing an embodiment of the present invention by further configuration of the processor by instructions for performing the algorithms and/or operations described herein. The processor may include, among other things, a clock, an arithmetic logic unit (ALU) and logic gates configured to support operation of the processor.

The mobile terminal 18 may also comprise a user interface including an output device such as a conventional earphone or speaker 34, a ringer 32, a microphone 36, a display 38, and a user input interface, all of which are coupled to the processor 30. The user input interface, which allows the mobile terminal to receive data, may include any of a number of devices allowing the mobile terminal to receive data, such as a keypad 40, a touch display (not shown) or other input device. In embodiments including the keypad, the keypad may include the conventional numeric (0-9) and related keys (#, *), and other hard and soft keys used for operating the mobile terminal Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal further includes a battery 44, such as a vibrating battery pack, for powering various circuits that are required to operate the mobile terminal, as well as optionally providing mechanical vibration as a detectable output.

The mobile terminal 18 may further include a user identity module (UIM) 48. The UIM is typically a memory device having a processor built in. The UIM may include, for example, a subscriber identity module (SIM), a universal integrated circuit card (UICC), a universal subscriber identity module (USIM), a removable user identity module (R-UIM), etc. The UIM typically stores information elements related to a mobile subscriber. In addition to the UIM, the mobile terminal may be equipped with memory. For example, the mobile terminal may include volatile memory 50, such as volatile Random Access Memory (RAM) including a cache area for the temporary storage of data. The mobile terminal may also include other non-volatile memory 52, which may be embedded and/or may be removable. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the controller, which determines an identity of the current cell, e.g., cell id identity or cell id information, with which the mobile terminal is in communication.

The processor 30 and, in some embodiments, the non-volatile memory 52 and potentially other components may comprise an apparatus. As shown in FIG. 3, the apparatus may be embodied as a mobile terminal 18 or a fixed communication device or computing device configured to employ an example embodiment of the present invention. However, in some embodiments, the apparatus, including the processor, may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

Figure 4:
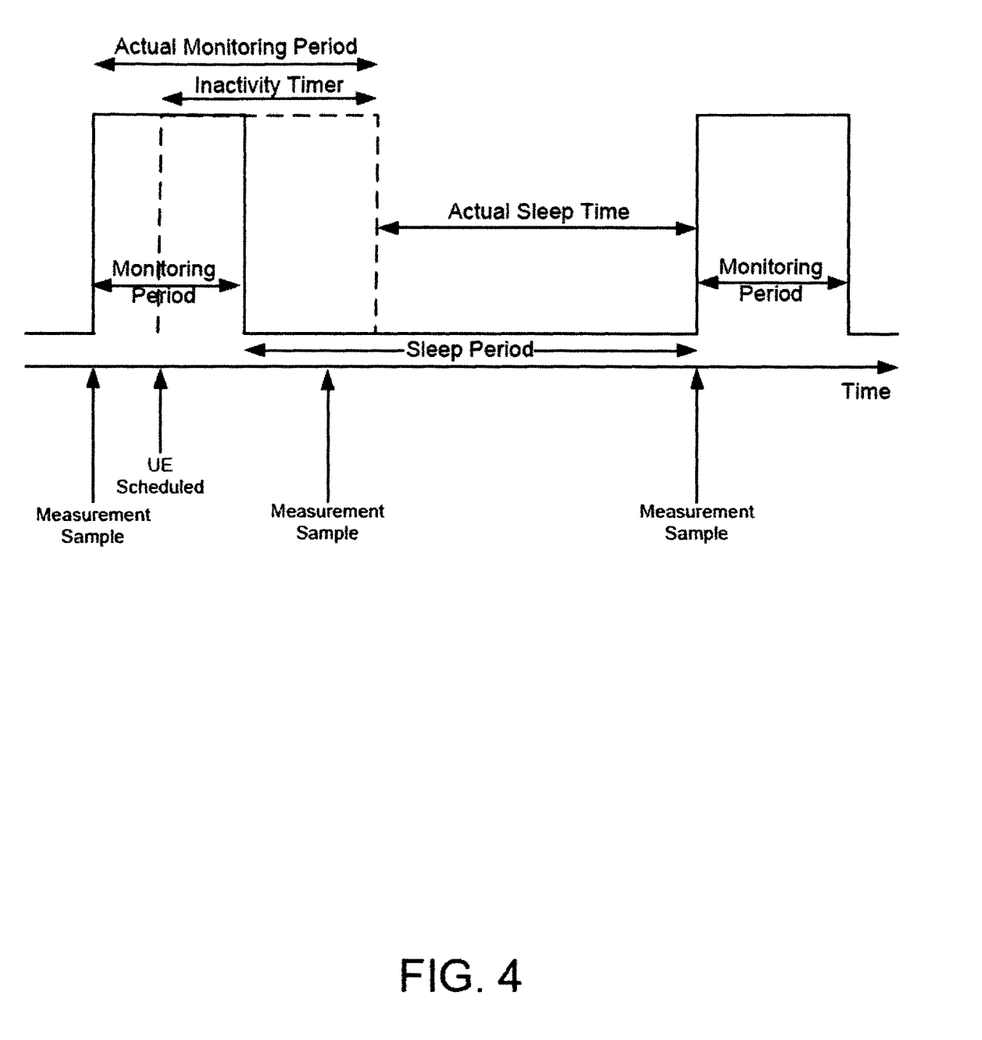
FIG. 4 is a timing diagram illustrating measurement sampling for purposes of a handover determination.

As shown in FIG. 4, the mobile terminal 18 in a connected state, such as a radio resource control (RRC) connected state, may be configured for discontinuous reception so as to monitor network communications, such as by monitoring for signals directed to the mobile terminal via the PDCCH, during predefined monitoring periods. These monitoring periods may have an initial duration that is illustrated in solid lines in FIG. 4 and is defined as an "on duration". In instances in which the mobile terminal is scheduled with new data, such as for transmission or reception via the uplink or downlink during a monitoring period as shown in FIG. 4 by the designation "UE scheduled", an inactivity timer may be initiated such that the mobile terminal continues to monitor for network communications directed to the mobile terminal for at least a period of time defined by the inactivity timer. As shown in FIG. 4, the inactivity timer may extend beyond the initial monitoring period such that the monitoring period is effectively extended. Once the on duration of the initial monitoring period and all inactivity timers have expired, the monitoring period may terminate and the mobile terminal may enter a sleep period during which the mobile terminal remains connected, such as by remaining in an RRC connected state, but does not actively monitor for network communications directed to the mobile terminal. The sleep period may have a predefined maximum time length indicated as the sleep period in FIG. 4. As shown in FIG. 4, however, an extension of the monitoring period, such as occasioned by the scheduling of new data to the mobile terminal, may reduce the length of time that the mobile terminal actually sleeps from the maximum time length defined by the sleep period to a shorter period of time identified as the actual sleep time. Upon the expiration of the sleep period, the mobile terminal of this embodiment again enters a monitoring period in which the mobile terminal monitors network communications for signals directed to the mobile terminal. This process may be repeated while the mobile terminal remains in a connected state so as to conserve power.

As also shown in FIG. 4, the mobile terminal 18 may obtain measurement samples during the monitoring period. These measurement samples measure various parameters associated with the signals received from the serving cell 16 as well as signals received from other cells, that is, candidate cells, supported by other base stations 14 in the region. The measurement samples that are obtained are analyzed by the mobile terminal to determine if one or more conditions are satisfied that would indicate that the mobile terminal should be handed over to another cell. While various parameters may be measured, the measurement samples of one embodiment obtain the received signal reference power (RSRP) and the received signal reference quality (RSRQ) of the serving cell and the other candidate cells from which the mobile terminal receives signals. In this embodiment, a threshold condition for the consideration of a handover may be that RSRP or RSRQ of a candidate cell exceeds that of the serving cell.

In the absence of such a triggering condition being met, the measurement samples may be obtained at a first frequency. However, if the triggering condition is met, such as by the RSRP or RSRQ of a candidate cell exceeding that of the serving cell, a sampling time period may be initiated and one or more additional measurement samples may be obtained during the sampling time period, generally at a frequency that is greater than the first frequency. In one example embodiment the sampling time period equals a time to trigger (TTT), but, on other embodiments, the sampling time period may be different than the TTT. As described above, these additional measurement samples may be averaged or otherwise considered in conjunction with the initial measurement sample that triggered further consideration of the possibility of a handover in order to avoid overreacting to the initial measurement sample that may represent a single potentially transient or errant variation in the RSRP or RSRQ by determining that a candidate cell appears to offer improved performance, such as in terms of RSRP or RSRQ, over a period of time. Based upon the plurality of measurement samples, handover may then be effected, if appropriate, which should result in more reliable handovers with a lower probability of handover failure (which may, in turn, result in radio link failure) and a lower probability of handover oscillation or ping pong, particularly in instances in which the mobile terminal 18 is in transit and is moving relatively rapidly.

In an instance in which the mobile terminal 18 has discontinuous reception functionality, the monitoring period limits the window of time during which the mobile terminal must obtain these additional measurement samples. In some instances, the monitoring period may be sufficient to obtain the desired number of measurement samples within the sampling time period. For example, the extension of the monitoring time period occasioned by the mobile terminal 18 being scheduled, such as for the transmission or reception of data during the initial monitoring period, may provide a sufficient time period in which to obtain the multiple measurement samples that are desired to determine if a handover is appropriate. In other instances, however, the monitoring period, whether extended or not, may be insufficient to obtain the desired number of additional measurement samples.

Figure 5:
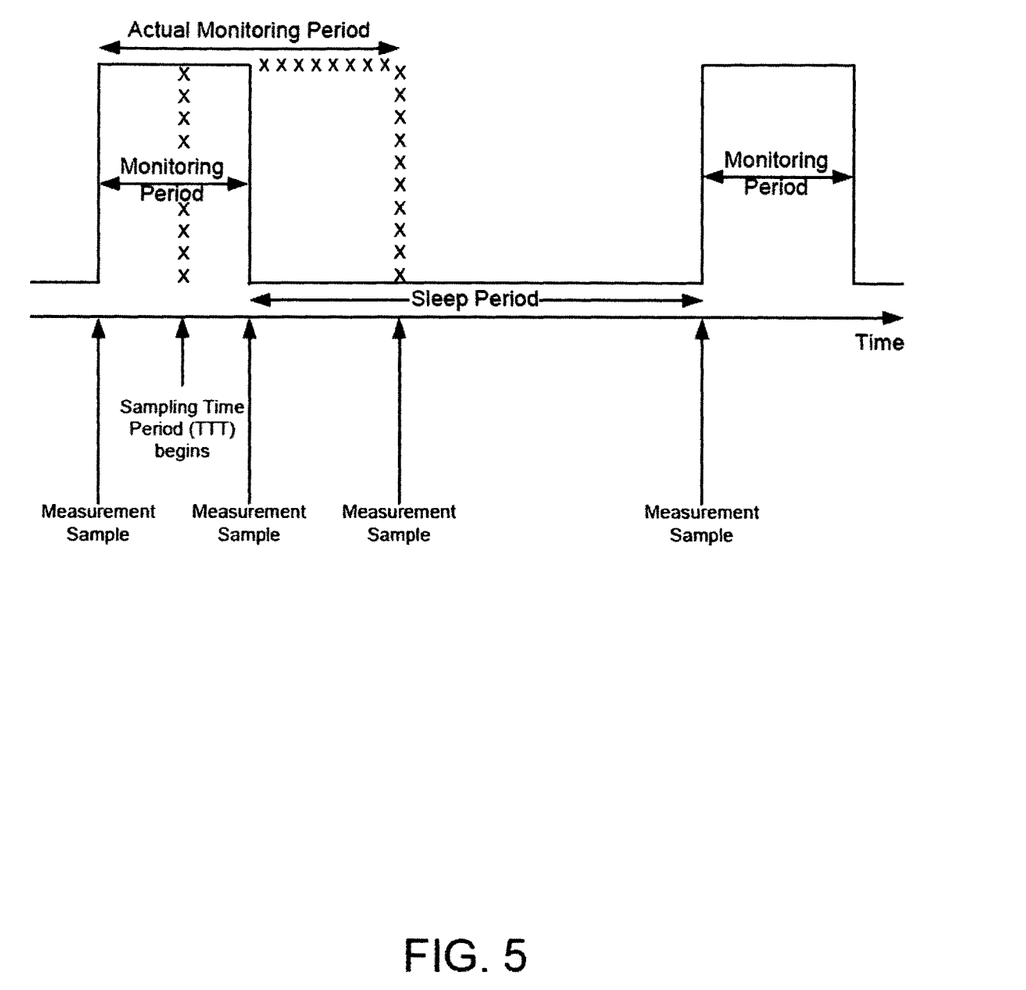
FIG. 5 is a timing diagram illustrating measurement sampling for purposes of a handover determination in which the sleep period has been deferred and the monitoring period has been extended in accordance with one embodiment of the present invention.

As shown in FIG. 5, the method, apparatus and computer program product of embodiments of the present invention may cause one or more additional measurement samples to be obtained at respective times that otherwise would have been outside of the discontinuous reception monitoring periods and in the intervening sleep period. In one embodiment shown in FIG. 5, the monitoring period may be extended and the sleep period may be deferred such that additional measurement samples are obtained during the extended monitoring period that continues beyond the time at which the monitoring period would have otherwise terminated. As shown in FIG. 5, the mobile terminal 18 may remain active during the extended monitoring period so as to monitor signals from the network for signals directed to the mobile terminal in the same manner as during the initial monitoring period. In another embodiment, the mobile terminal may remain active during the extended monitoring period, but may only receive and use the information or symbols necessary to perform the required measurements, e.g., RSRP and/or RSRQ, but may not receive and/or use other signals that are directed to the mobile terminal, for example, for scheduling purposes. Alternatively, the mobile terminal may be configured to enter a sleep period following termination of the initial monitoring period, but to then reawake at the time that the measurement sample is to be obtained in order to capture the measurement sample prior to returning to sleep. This process may be repeated by the mobile terminal for each measurement sample that is to be obtained following the expiration of the initial monitoring period. The measurement samples may be obtained in a relatively continuous manner or a predefined number of measurement samples, such as two or more measurement samples, may be obtained during the sampling time period. In this embodiment, the additional measurement samples may be either equally or unequally spaced throughout the sampling time period. In some example embodiments, the mobile terminal may be provided with requirements as to the number of measurements to perform during the sampling time period. In this regard, the number of measurements may be configurable by the network or may be otherwise specified in order to satisfy, for example, some minimum performance requirements.

Figure 6:
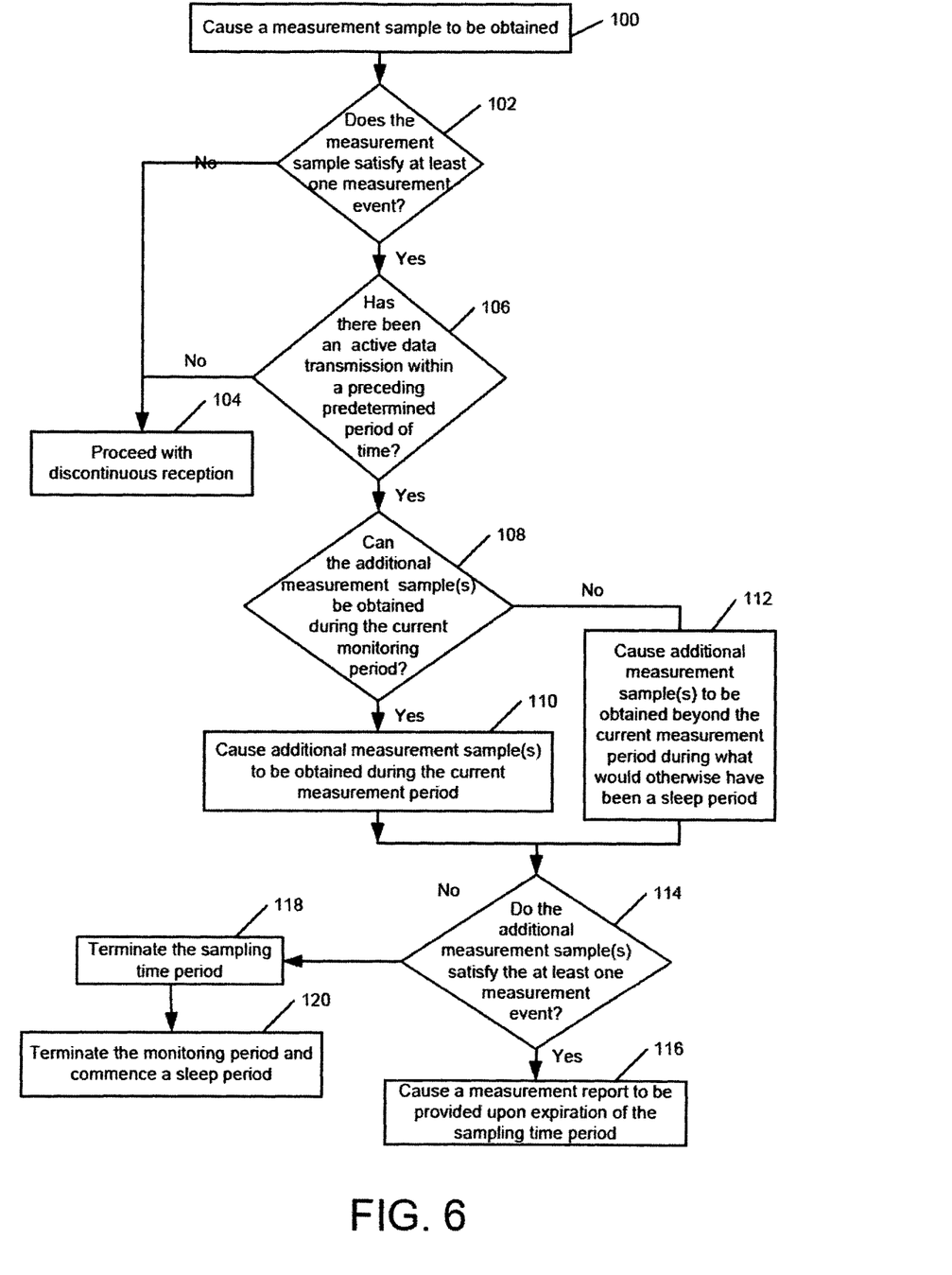
FIG. 6 is a flow chart illustrating operations performed in accordance with one embodiment of the present invention.

In order to provide further detail regarding the method, apparatus and computer program product of an example embodiment of the present invention, reference is now made to the flow chart of FIG. 6 in which the operations performed in accordance with an example embodiment are illustrated. As shown in Block 100 of FIG. 6, an apparatus embodied, for example, by the mobile terminal 18 may include means, such as the processor 30, the receiver 26 or the like, for causing a measurement sample to be obtained, such as at a first frequency. As described above, the measurement sample may be obtained during a discontinuous reception monitoring period, such as shown in FIG. 5. While various parameters may be measured, examples of the parameters that may be measured include the RSRP and RSRQ of the serving cell, as well as one or more other cells, e.g., neighboring and/or candidate cells, from which the mobile terminal receives signals. As used herein, candidate cell may, in one embodiment, include any neighbor cell, while including only a chosen cell, e.g., the handover candidate, in another embodiment.

The apparatus may also include means, such as the processor 30 or the like, for determining whether the measurement sample satisfies the criteria for at least one measurement event. See block 102. In this regard, various measurement events may be defined, including, for example, the RSRP and/or the RSRQ of a candidate cell exceeding the RSRP and/or the RSRQ of the serving cell. In an instance in which the measurement sample does not satisfy a measurement event, the apparatus may include means, such as the processor or the like, for proceeding with discontinuous reception by monitoring network communications for signals intended for the mobile terminal within the monitoring period, as well as obtaining additional measurement samples at the first frequency within the monitoring period. See block 104.

Although the method, apparatus and computer program product of an example embodiment may proceed directly to determine the manner in which the additional measurement samples are to be obtained in an instance in which the one or more initial measurement sample(s) is determined to have satisfied at least one measurement event, the apparatus of the illustrated embodiment may optionally include means, such as the processor 30 or the like, for initially determining if there has been an active data transmission via the uplink or the downlink with the mobile terminal within a preceding predetermined period of time. In this embodiment, if there has not been an active data transmission via the uplink or the downlink with the mobile terminal within the preceding predetermined period of time, the apparatus may optionally include means, such as the processor or the like, for proceeding with discontinuous reception as described above and as shown in FIG. 1 and need not modify its operations in an effort to obtain additional measurement samples. See block 106. In this scenario, the lack of any active data transmission via the uplink or the downlink with the mobile terminal within the preceding predetermined period of time causes the probability of any subsequent data transmission involving the mobile terminal within the current monitoring period to be relatively remote. Since the likelihood of having an active data transmission via the uplink or the downlink with the mobile terminal during the remainder of the current measurement period is relatively small, the advantages offered by determining if a measurement event is satisfied for the sampling time period and, if so, issuing a measurement report to the network which may, in turn, affect a handover is reduced. Accordingly, by proceeding with discontinuous reception, the apparatus of this embodiment may take advantage of the power savings offered by the sleep period provided between the discontinuous reception monitoring periods.

In instance in which there has been an active data transmission via either the uplink or the downlink with the mobile terminal 18 within the preceding predetermined period of time or in an embodiment in which the method, apparatus and computer program product does not take into account the timing of the most recent active data transmission, the apparatus may include means, such as a processor 30 or the like, for determining if the additional measurement samples that are desired for evaluating the measurement event throughout the sampling time period can be obtained during the current measurement period, which may equal the sampling time period in this instance. See block 108. For example, the processor may know or have access to information that defines the number of additional measurement samples to be obtained and the frequency with which those measurements are obtained. For example, the frequency with which the additional measurement samples are obtained may be greater than the first frequency with which measurement samples are obtained prior to the measurement samples satisfying at least one measurement event. Based upon the number of additional measurement samples and the frequency with which those measurement samples are to be obtained, the processor of this embodiment may determine if the time remaining in the current measurement period, e.g., the actual monitoring period, is sufficient to obtain the additional measurement samples. If so, the apparatus may include means, such as the processor, the receiver 26 or the like, for obtaining the additional measurement samples during the current measurement period. See block 110.

If, however, the processor 30 determines that the additional measurement samples cannot be obtained during the current measurement period, the apparatus may include means, such as the processor, the receiver 26 or the like, for causing additional measurement samples to be obtained at respective times beyond the current measurement period. See block 112. Indeed, by causing measurement samples to be obtained at respective times beyond the current measurement period, the additional measurement samples are obtained at respective times that otherwise would have been within the sleep period between monitoring periods. As shown in FIG. 5, the apparatus, such as the processor, the receiver or the like, may cause the additional measurement samples to be obtained by extending the measurement period and deferring the sleep period for a sufficient length of time, e.g., a period of time equal to the sampling time period or TTT, to allow the additional measurement samples to be obtained. As noted above, the measurement period may be extended in a continuous manner such that the mobile terminal continues to monitor signals from the network for those directed to the mobile terminal during the extended portion of the monitoring period or, alternatively, the mobile terminal may only receive those symbols or other information necessary to perform the required measurements, e.g., RSRP and/or RSRQ, during the extended portion of the monitoring period. Alternatively, the mobile terminal 18 may enter a sleep mode upon termination of the current measurement period and may thereafter awaken at each of the respective times at which an additional measurement sample is to be obtained. While discussed above in conjunction with additional measurement samples that are obtained at a predefined frequency, the measurement samples may be obtained in such a manner that the measurement samples are not equally spaced. For example, the mobile terminal may obtain relatively frequent measurements from the serving cell, but may obtain measurement samples of the candidate cell in available time slots, which may or may not be evenly spaced.

Based upon the measurement samples, the apparatus may include means, such as the processor 30 or the like, for determining whether the additional measurement sample(s) continue to satisfy the at least one measurement event. See block 114. While the apparatus may make the determination as to whether or not the additional measurement sample(s) satisfy the at least one measurement event in various manners, such as those described above in conjunction with block 102, the apparatus, such as the processor, of one example embodiment may determine the average RSRP and/or average RSRQ of the measurement samples obtained from the current cell and each of the candidate cells. If the average RSRP or average RSRQ of a candidate cell exceeds the average RSRP or RSRQ of the serving cell, the apparatus, such as the processor, may determine that the additional measurement sample(s) continue to satisfy the at least one measurement event. In an instance in which the mobile terminal, such as a processor, determines that the additional measurement sample(s) do continue to satisfy the at least one measurement event, the apparatus may include means, such as a processor, the transmitter 24 or the like, for causing a measurement report to be provided to the network upon expiration of the sampling time period. See block 116. Alternatively, if the apparatus, such as a processor, determines that the additional measurement sample(s) do not continue to satisfy the at least one measurement event, the apparatus may include means, such as a processor or the like, for terminating the sampling time period if the sampling time period is not already expired and terminating the monitoring period and commencing the sleep period so as to take advantage of the power savings offered by the discontinuous reception. See blocks 118 and 120.

According to one aspect of the example embodiments of present invention, the functions performed by the apparatus, such as those illustrated by the control flow diagram and flowchart of FIG. 6, may be performed by various means. It will be understood that each block or operation of the control flow diagram and flowchart, and/or combinations of blocks or operations in the control flow diagram and flowchart, can be implemented by various means. Means for implementing the blocks or operations of the control flow diagram and flowchart, combinations of the blocks or operations in the control flow diagram and flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 52 of the example apparatus, and executed by a processor, such as the processor 30 of the example apparatus. As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the control flow diagram and flowchart's block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the control flow diagram and flowchart's block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the control flow diagram and flowchart's block(s) or operation(s).

Accordingly, execution of instructions associated with the blocks or operations of the control flow diagram and flowchart by a processor 30, or storage of instructions associated with the blocks or operations of the control flow diagram and flowchart in a computer-readable storage medium, supports combinations of operations for performing the specified functions. It will also be understood that one or more blocks or operations of the control flow diagram and flowchart, and combinations of blocks or operations in the control flow diagram and flowchart, may be implemented by special purpose hardware-based computer systems and/or processors which perform the specified functions, or combinations of special purpose hardware and program code instructions.

By modifying the discontinuous reception so as to accommodate the additional measurement samples to be obtained during the sampling time period, such as during the time to trigger, a mobile terminal 18 may more reliably identify instances in which it would be advisable to be handed over to another cell 16. In this regard, the mobile terminal may obtain a number of measurement samples such that the determination of whether or not a handover is to be effected can be based on a number of measurement samples obtained over time, as opposed to one or a very small number of measurement samples that may not be truly indicative of the current signaling conditions of the serving cell and the candidate cells. By effecting handover in those instances in which a more fulsome set of measurement samples have been collected, a method, apparatus and computer program product of an embodiment of the present invention may reduce instances in which the handover (and, in turn, the radio link) fails and/or reduce instances of handover oscillation or ping pong, particularly in instances in which the mobile terminal is moving, such as at a relatively rapid rate. Although the modifications to the discontinuous reception may slightly reduce the power savings benefits offered by discontinuous reception, the method, apparatus and computer program product of embodiments of the present invention may maintain many of the power savings benefits, including implementation of sleep periods between monitoring periods. Additionally, the method, apparatus and computer program product of embodiments of the present invention may permit the TTT settings, such as the number of additional measurement samples to be obtained and the frequency at which the additional measurement samples are obtained, to remain the same, regardless of whether the mobile terminal has implemented discontinuous reception or not.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. For example, the method, apparatus and computer program product of an example embodiment of the present invention may be utilized in conjunction with various types of handovers or reselections including intra-frequency, inter-frequency and inter-radio access technology (inter-RAT) handovers or reselections. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. A method comprising:
    causing a measurement sample to be obtained during a discontinuous reception monitoring period;
    determining that a sampling time period has been commenced based upon the measurement sample during which one or more additional measurement samples are to be obtained;
    determining that the additional measurement samples will not be obtained prior to commencement of a sleep period between monitoring periods;
    determining an elapsed time since a most recent data transmission; and
    causing one or more additional measurement samples to be obtained at respective times beyond the sampling time period during what would otherwise have been the sleep period in response to the determination that the additional measurement samples will not be obtained prior to commencement of the sleep period, wherein causing one or more additional measurement samples to be obtained is dependent upon the elapsed time being less than a predefined time limit.

2. A method according to claim 1 wherein causing one or more additional measurement samples to be obtained comprises deferring the sleep period and causing the monitoring period to be extended in order to obtain the additional measurement samples prior to commencement of the sleep period.

3. A method according to claim 2 further comprising, in an instance in which the sampling time period is terminated prior to expiration:
  terminating deferral of the sleep period and extension of the monitoring period; and
  entering the sleep period.

4. A method according to claim 1 further comprising causing a measurement report to be provided upon expiration of the sampling time period.

5. An apparatus comprising at least one processor and at least one memory including computer program code, the at least one memory and the computer program code configured to, with the at least one processor, cause the apparatus at least to:
  cause a measurement sample to be obtained during a discontinuous reception monitoring period;
  determine that a sampling time period has been commenced based upon the measurement sample during which one or more additional measurement samples are to be obtained;
  determine that the additional measurement samples will not be obtained prior to commencement of a sleep period between monitoring periods;
  determine an elapsed time since a most recent data transmission; and
  cause one or more additional measurement samples to be obtained at respective times beyond the sampling time period during what would otherwise have been the sleep period in response to the determination that the additional measurement samples will not be obtained prior to commencement of the sleep period,
  wherein the at least one memory and the computer program code are configured to, with the at least one processor, cause one or more additional measurement samples to be obtained dependent upon the elapsed time being less than a predefined time limit.

6. An apparatus according to claim 5 wherein the at least one memory and the computer program code are configured to, with the at least one processor, cause the apparatus to cause one or more additional measurement samples to be obtained by deferring the sleep period and causing the monitoring period to be extended in order to obtain the additional measurement samples prior to commencement of the sleep period.

7. An apparatus according to claim 6 wherein the at least one memory and the computer program code are further configured to, with the at least one processor, cause the apparatus, in an instance in which the sampling time period is terminated prior to expiration, to:
  terminate deferral of the sleep period and extension of the monitoring period; and
  enter the sleep period.

8. An apparatus according to claim 5 wherein the at least one memory and the computer program code are further configured to, with the at least one processor, cause the apparatus to cause a measurement report to be provided upon expiration of the sampling time period.

9. An apparatus according to claim 5 wherein the apparatus is embodied by a mobile terminal.

10. An apparatus according to claim 9 further comprising a user interface configured to facilitate user control of at least some functions of the mobile terminal.

11. A computer program product comprising at least one non-transitory computer-readable storage medium bearing computer program code embodied therein for use with a computer, the computer program code comprising code for:
  causing a measurement sample to be obtained during a discontinuous reception monitoring period;
  determining that a sampling time period has been commenced based upon the measurement sample during which one or more additional measurement samples are to be obtained;
  determining that the additional measurement samples will not be obtained prior to commencement of a sleep period between monitoring periods;
  determining an elapsed time since most recent data transmission; and
  causing one or more additional measurement samples to be obtained at respective times beyond the sampling time period during what would otherwise have been the sleep period in response to the determination that the additional measurement samples will not be obtained prior to commencement of the sleep period, wherein the code for causing one or more additional measurement samples to be obtained is dependent upon the elapsed time being less than a predefined time limit.

12. A computer program product according to claim 11 wherein the computer program code for causing one or more additional measurement samples to be obtained comprises code for deferring the sleep period and causing the monitoring period to be extended in order to obtain the additional measurement samples prior to commencement of the sleep period.

13. A computer program product according to claim 12 wherein the computer program code further comprises code for, in an instance in which the sampling time period is terminated prior to expiration:
  terminating deferral of the sleep period and extension of the monitoring period; and
  entering the sleep period.

14. A computer program product according to claim 11 wherein the computer program code further comprises code for causing a measurement report to be provided upon expiration of the sampling time period.

* * * * *

UNITED STATES PATENT AND TRADEMARK OFFICE
CERTIFICATE OF CORRECTION

PATENT NO.       : 9,247,472 B2
APPLICATION NO.  : 14/110187
DATED            : January 26, 2016
INVENTOR(S)      : Dalsgaard It is certified that error appears in the above-identified patent and that said Letters Patent is hereby corrected as shown below:

In the claims:

Column 18,
Line 23, "since most recent data" should read --since a most recent data--.

Signed and Sealed this
Twenty-third Day of August, 2016

Michelle K. Lee
*Director of the United States Patent and Trademark Office*